Dec. 8, 1942.  W. E. BULLOCK  2,304,493
JIG FOR PLATE WELDING
Filed Jan. 27, 1941  4 Sheets-Sheet 1

Inventor
William E. Bullock
by Babcock & Babcock
Attorneys

Dec. 8, 1942.   W. E. BULLOCK   2,304,493
JIG FOR PLATE WELDING
Filed Jan. 27, 1941   4 Sheets-Sheet 2

Inventor
William E. Bullock
by Babcock & Babcock
Attorneys

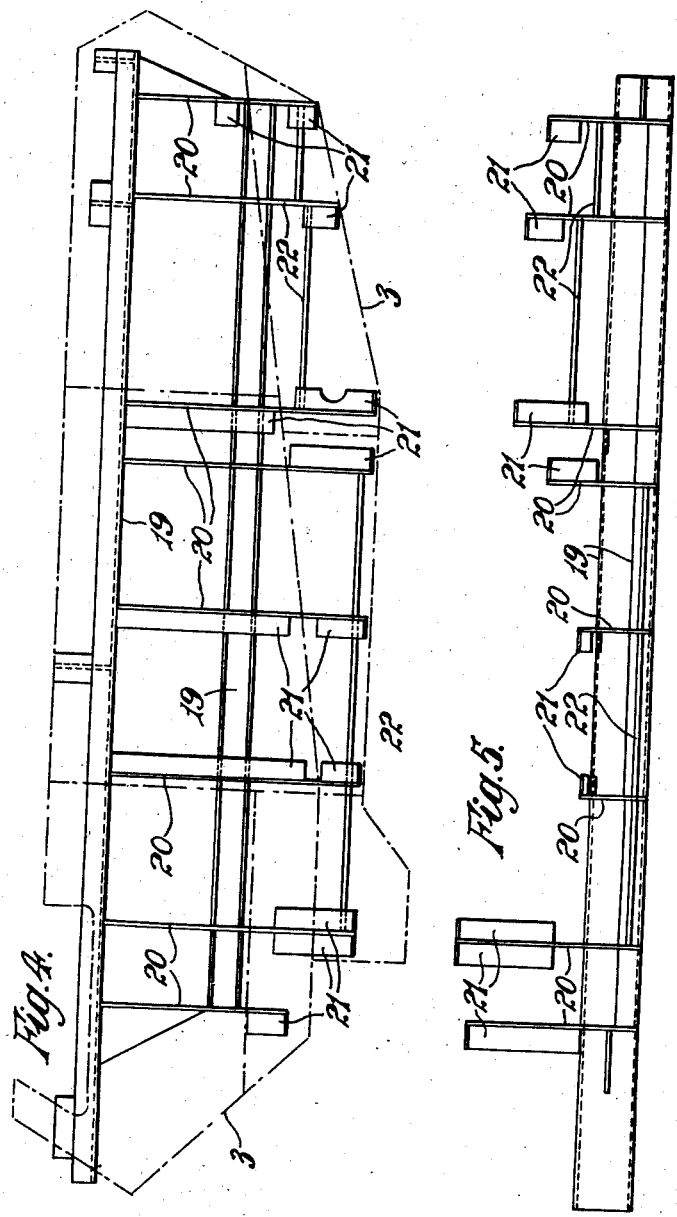

Dec. 8, 1942.   W. E. BULLOCK   2,304,493
JIG FOR PLATE WELDING
Filed Jan. 27, 1941   4 Sheets-Sheet 4

Inventor
William E. Bullock
by Babcock & Babcock
Attorney

Patented Dec. 8, 1942

2,304,493

UNITED STATES PATENT OFFICE 2,304,493

JIG FOR PLATE WELDING

William Edmund Bullock, near Compton, Wolverhampton, England, assignor to Guy Motors Limited, Wolverhampton, England Application January 27, 1941, Serial No. 376,235
In Great Britain May 30, 1939

5 Claims. (Cl. 113—99)

This invention relates to welding operations and more particularly to the welding of metal plates for vehicles and other structures in which the component plates are to be rigidly secured together along their adjacent edges.

It is known that where plates already highly stressed internally are rigidly held while their adjacent edges are welded together the additional stresses set up at and in the vicinity of the joint as the result of the welding operation will be such as to tend to cause the plates or the weld to crack.

In order to prevent this tendency to crack and at the same time to obtain a strong and uniform weld at the joint it is essential to allow for a certain amount of relative movement, technically known as breathing of the plates in the vicinity of the joint during the welding operation.

For this purpose the plates according to this invention are held in a jig which is constructed to allow for this breathing of the plates during the welding operation, the construction involving the use of plate clamping devices adapted to exert a resilient or yielding pressure on the plates.

In the accompanying drawings:

Figures 4 and 5 are a plan view and a side elevation respectively of an auxiliary female jig adapted to support the welded plates when the latter are removed from the main jig and to facilitate internal welding of the joints.

Figure 1:
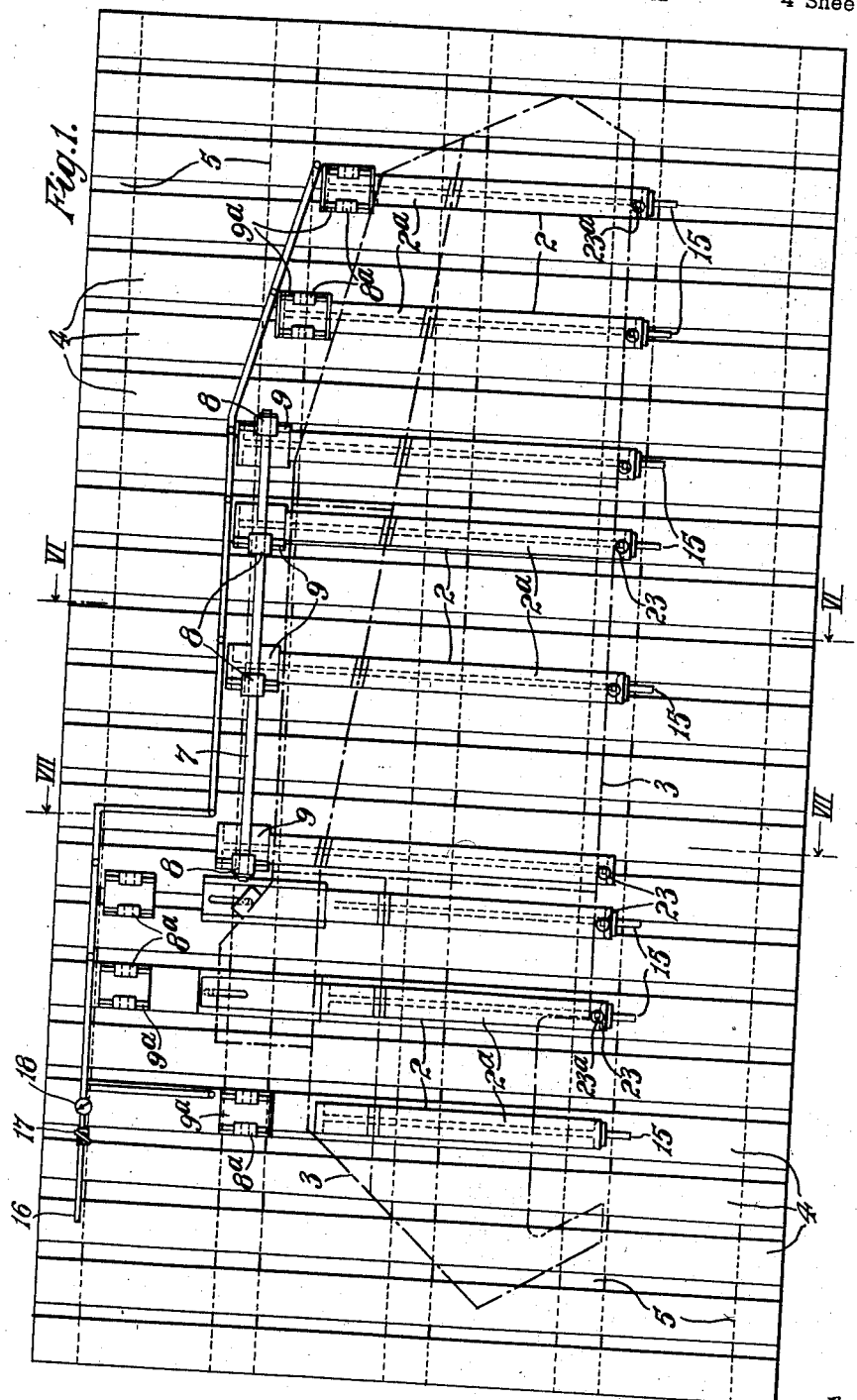
Figure 1 is a plan view of the jig with the clamping means removed for the sake of clearness.

Referring to the drawings the main jig comprises a plurality of plate supporting members 2 which may be castings or forgings and are formed and machined to support the plates 3 in the planes in which they are to be welded together along their adjacent edges. The said members may be either adjustably mounted upon or welded to a rigid base structure which may, as shown, consist of a series of rolled steel joists 4 spaced apart parallel with each other and laid across and firmly welded to another series of similar joists 5.

The upper surfaces 2ª of the members 2 determine the angle at which adjacent plates are to be welded together and are co-extensive with or extend beyond the dimensions of the plates in one direction. The dimensions of the plates in the other direction can be accommodated by adjusting the positions of the members 2 on the base structure.

When the plates are laid on their supporting members 2 they are held in position thereon by means of clamping devices carried by arms 6 of which there may be one for each member 2. Each of the said arms is pivotally mounted adjacent one end of its associated member 2. For this purpose a shaft 7 is mounted in bearings 8 on supports 9 and the arms 6 are pivotally mounted or secured thereon. In some cases separate bearings 8ª on supports 9ª are provided to carry the said arms. The clamping devices may be of any suitable type, such as hydraulic, spring-loaded, or the pneumatic type 10 shown, and have universally jointed base members 11 for contact with the plates. The free end of each arm can be locked in position of use by means of a retaining bar 12 pivoted at 13 to said arm and having a shackle 14 at its free end adapted to engage a hook member 15 on the member 2. Each clamp 10 is provided with an operating valve 10ª and when the plates are in position and the arms locked by means of the bars 12, the valves are opened and the plates clamped in position ready for the welding operation.

In the main supply line 16 a reducing valve 17 is incorporated together with a pressure gauge 18 so that the pressure of the clamps 10 on the plates can be adjusted at will. In addition a separate reducing valve and differential gauge (not shown) may be associated with each of the clamps, or the supply lines leading thereto, so that the pressure of each of the clamps on the plates can be independently adjusted. In order to allow the plates to breathe when clamped in position, which is necessary to overcome any internal stresses that may be set up in the plates due to welding, the plates are clamped at carefully selected points away from their edges and the pressure of the clamps so adjusted as to allow a predetermined degree of resilience. By clamping the plates in this manner it is found that they do not crack and the welded joint is relieved of stresses which otherwise would occur if the plates were rigidly clamped by the ordinary mechanical methods.

Figure 6:
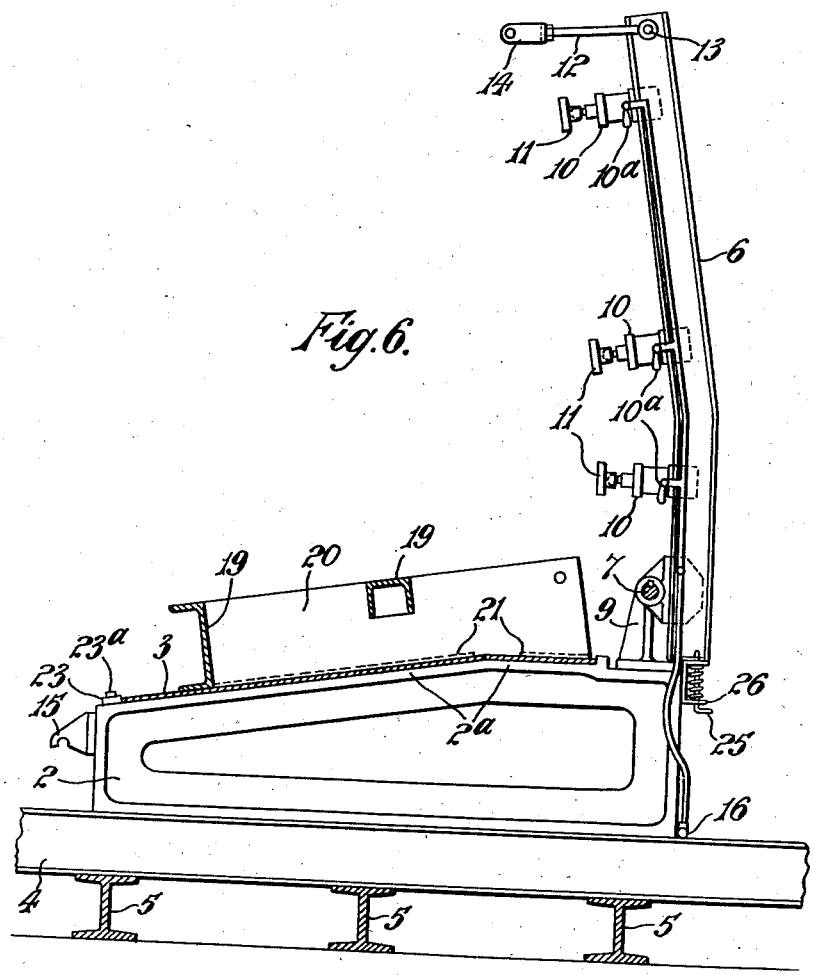
Figure 6 is a cross-section taken on the line VI—VI of Figure 1 showing the clamping means in the inoperative position and the female jig placed in position ready for the removal of the welded plates.

In order to facilitate internal welding of the joints, and to support the plates when reversed for this purpose, an auxiliary female jig is provided. This auxiliary jig as shown in Figures 4, 5 and 6, may conveniently consist of longitudinal channel members 19 to which are welded plates 20 disposed laterally thereto and carrying attachment lugs or plates 21 which are so positioned as to lie against the plates 3 when in position of use as shown in Figure 6. Strengthening bars, such as 22 may be welded between the plates 20 to increase the rigidity of the jig.

When the external welding operation has been completed, the valves 10ª are operated to release the pressure of the clamps 10, the shackles 14 disengaged from the hooks 15 and the clamping arms 6 swung about their pivotal supports, clear of the welded plates as shown in Figure 6. The auxiliary jig can then be placed in position with its attachment plates 21 lying against the said welded plates 3, to which they may be secured in any convenient manner such as by bolts or clamps. In the former case, the plates 21 will have holes formed therein at positions which correspond with holes normally provided in the plates 3, for assembly and other purposes, when the auxiliary jig is in its position of use. The auxiliary jig can then be removed from the main jig together with the attached welded plates which it serves to support during the internal welding operation.

Figure 7:
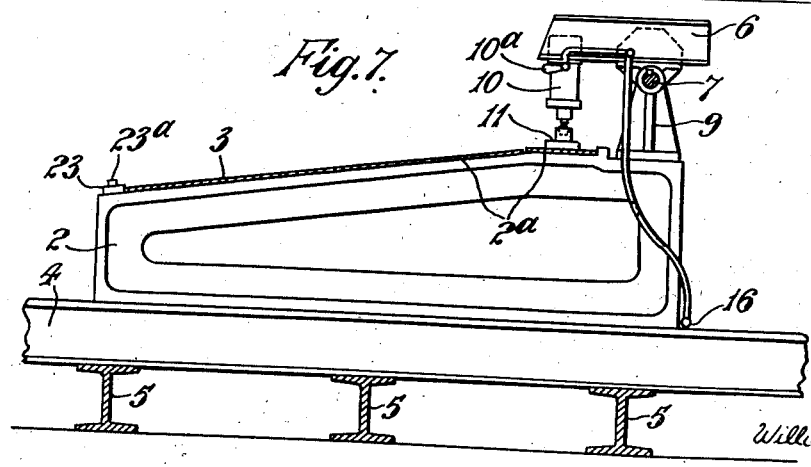
Figure 7 is a cross-section taken on the line VII—VII of Figure 1 showing a modified form of the clamping means.

To provide for a fine adjustment of the plates 3 on the members 2 prior to the external welding operation, eccentric discs or cams 23 are rotatably mounted on said members and may be rotated by a tool or key (not shown) engaging suitably shaped portions 23ª on said discs or cams.

Where openings for inspection covers, doors or the like are provided in the plates to be welded together, the clamping arm 6 at this point will not extend across the said opening, but is of such length as will carry the clamp or clamps to secure the adjacent plate or plates. Such an arrangement is shown in Figure 7 and in this case the clamping arm is keyed to its supporting shaft 7 so that when another clamping arm or arms, which are also keyed to said shaft, is or are locked in the operative position, the first clamping arm will also be held in its operative position.

Figure 2:
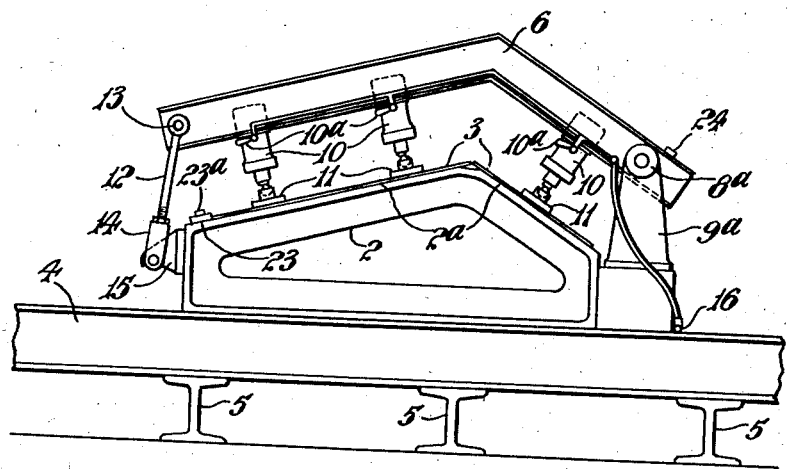
Figure 2 is a view of one end of the jig showing the clamping means in the operative position.
Figure 3:
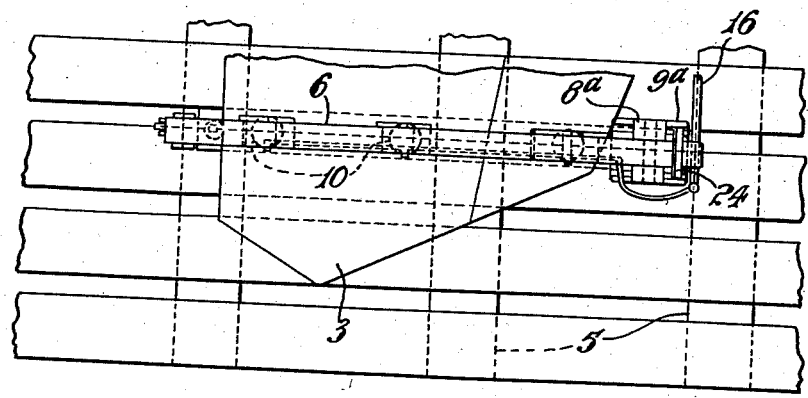
Figure 3 is a plan view of that end of the jig which is shown in Figure 2.

The clamping arms may be supported in their inoperative positions in any convenient manner. In the form shown in Figures 2 and 3, a short bar or stop 24 is secured on the clamping arm in such a position that it will engage the support 9ª when in the inoperative position. Another arrangement for this purpose is shown in Figure 6 in which a spring pressed bolt 25 carried by a bracket 26 on the member 2, engages a hole in the end of the clamping arm or in a plate or lug thereon when the said arm is in its inoperative position. The clamping arm can be released by withdrawing the bolt from the said hole against the action of its spring. Alternatively the spring pressed bolt may be mounted on the end of the clamping arm, and co-operate with a hole in a plate or lug on the member 2.

A master valve may be provided in the main supply line 16 in addition to the reducing valve 17 so that the clamps can all be simultaneously released when the external welding operation is completed.

Instead of providing for a separate internal welding operation of the joints in which the auxiliary jig is employed to facilitate reversal of the plates, an internal or wash weld may be applied from the outside of the joints. In this connection the members 2 or additional supporting means situated behind the joints between the plates, may be recessed to receive metal backing strips of copper or other suitable material to facilitate the application of the internal wash weld, and for this purpose a narrow space is left between the adjacent edges of the plates.

From the foregoing it will be seen that the improved jig of this invention may be adapted for use in supporting plates or other members to be welded along their edges for many structures and purposes.

I claim:

1. Plate welding jig comprising a rigid base structure, a plurality of plate supporting members mounted thereon and adapted to support the plates in the relative planes in which they are to be welded together by their adjacent edges, and having their upper surfaces recessed in the vicinity of the joint to be welded to receive metal backing strips, a plurality of pivoted arms associated with said plate supporting members, clamping devices carried by said arms and adapted to exert a resilient pressure on the plates and means for locking said arms against the reaction of said clamping devices.

2. Plate welding jig comprising a rigid base structure, a plurality of plate supporting members mounted thereon and adapted to support the plates in the relative planes in which they are to be welded together by their adjacent edges, a plurality of fluid operated plate clamping devices co-operating with said plate supporting members and adapted to exert an adjustable and yielding pressure on the plates during the welding operation and means for locking said plate clamping devices in their operative positions.

3. Plate welding jig comprising a rigid base structure, a plurality of plate supporting members mounted thereon and adapted to support the plates in the relative planes in which they are to be welded together by their adjacent edges, a plurality of fluid operated plate clamping devices co-operating with said plate supporting members and adapted to exert an adjustable and yielding pressure on the plates during the welding operation, means for adjusting the pressure of said clamping devices and means for locking the same in their operative positions.

4. A plate welding jig comprising a rigid base structure, a plurality of plate supporting members mounted on said base to support a plurality of plates in proper position relative to each other during the welding operation, a plurality of pivoted arms associated with said members, yielding clamping devices carried by said arms and yieldingly thrusting in the general direction of swinging movement of said arms, and means for locking said arms in operative position against the thrusting action of said clamping devices, each said clamping device comprising a base member, and means interposed between said base member and one of said arms and operative independently of the movement of said arm to force said base member into cushioned thrust contact with a plate portion.

5. A plate welding jig comprising a rigid base structure, a plurality of plate supporting members mounted on said base to support a plurality of plates in proper position relative to each other during the welding operation, a plurality of pivoted arms associated with said members, clamping devices carried by said arms and thrusting in the general direction of swinging movement of said arms, and means for locking said arms in operative position against the thrusting action of said clamping devices, each said clamping device comprising a plunger, a base member, and means operative independently of the arm upon which said device is mounted and after said arm has been locked to force said base member into cushioned thrust contact with a plate portion, said base member and plunger being connected together in the line of thrust with a universal joint.

WILLIAM EDMUND BULLOCK.